USO10952377B2

(12) United States Patent
Goering et al.

(10) Patent No.: US 10,952,377 B2
(45) Date of Patent: Mar. 23, 2021

(54) COTTON PICKER UNIT LIFT STRUCTURE

(71) Applicant: DEERE & COMPANY, Moline, IL (US)

(72) Inventors: Kevin J. Goering, Cambridge, IA (US); John O. Rumohr, Pleasant Hill, IA (US); Barrett D. Reed, Pella, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/668,605

(22) Filed: Oct. 30, 2019

(65) Prior Publication Data
US 2020/0060086 A1 Feb. 27, 2020

Related U.S. Application Data

(62) Division of application No. 15/654,924, filed on Jul. 20, 2017, now Pat. No. 10,517,217.

(51) Int. Cl.
A01D 46/08 (2006.01)
A01D 67/00 (2006.01)

(52) U.S. Cl.
CPC ........... A01D 46/08 (2013.01); A01D 46/081 (2013.01); A01D 67/005 (2013.01)

(58) Field of Classification Search
CPC .... A01D 46/08; A01D 46/081; A01D 67/005; A01D 46/20; A01D 46/085; A01D 46/14; A01D 41/16; A01D 41/145; A01D 46/12; A01B 59/064; A01B 63/004; A01B 73/044
See application file for complete search history.

(56) References Cited

U.S. PATENT DOCUMENTS

| 3,182,831 | A | * | 5/1965 | Bergmann | E02F 3/352 414/705 |
| 3,731,470 | A | * | 5/1973 | Cornish | A01D 75/285 56/10.4 |
| 4,249,365 | A | * | 2/1981 | Hubbard | A01D 46/08 56/13.2 |
| 4,803,830 | A | * | 2/1989 | Junge | A01D 46/081 56/13.5 |
| 4,824,319 | A | * | 4/1989 | Arnold | E02F 3/3613 414/723 |
| 4,947,628 | A | * | 8/1990 | Orsborn | A01D 46/08 56/13.5 |
| 4,993,216 | A | * | 2/1991 | Covington | A01D 46/08 56/15.9 |
| 5,018,343 | A | | 5/1991 | Finke | |
| 5,063,728 | A | * | 11/1991 | Garter | A01D 43/082 111/57 |
| 5,077,960 | A | * | 1/1992 | Covington | A01D 46/081 56/28 |
| 5,081,828 | A | * | 1/1992 | Covington | A01D 46/081 56/13.5 |
| 5,090,184 | A | | 2/1992 | Garter et al. | |

(Continued)

Primary Examiner — Arpad Fabian-Kovacs
(74) Attorney, Agent, or Firm — Taft Stettinius & Hollister LLP; Stephen F. Rost

(57) ABSTRACT

A cotton picker unit lift structure having a first frame, a second frame pivotally coupled to the first frame about a pivot axis, and at least one sliding joint coupling the first frame to the second frame. Wherein, the sliding joint is not positioned at the pivot axis.

17 Claims, 11 Drawing Sheets

(56) References Cited

U.S. PATENT DOCUMENTS

| | | | |
|---|---|---|---|
| 5,105,609 A * | 4/1992 | Covington | A01D 46/081 56/13.5 |
| 5,212,937 A | 5/1993 | Fachini et al. | |
| 5,311,728 A * | 5/1994 | Schlueter | A01D 46/12 56/28 |
| 5,343,677 A * | 9/1994 | Covington | A01D 46/081 56/10.2 F |
| 5,628,169 A * | 5/1997 | Stiller | A01D 34/43 56/249 |
| 5,732,781 A * | 3/1998 | Chambers | E02F 3/627 172/825 |
| 5,842,333 A * | 12/1998 | Brenek | A01D 46/08 56/28 |
| 6,098,388 A * | 8/2000 | Davies | A01D 34/62 56/249 |
| 6,105,682 A * | 8/2000 | Recker | E02F 3/7618 172/811 |
| 6,341,478 B1 * | 1/2002 | Sallstrom | A01D 34/62 56/199 |
| 6,412,258 B1 * | 7/2002 | Doerflinger | A01D 75/306 56/14.9 |
| 7,360,351 B2 * | 4/2008 | Rickert | A01D 41/144 56/228 |
| 7,789,612 B2 * | 9/2010 | Milani | B66F 9/125 187/237 |
| 7,841,158 B2 * | 11/2010 | Wilson | A01D 67/005 56/7 |
| 9,717,181 B2 * | 8/2017 | Boyd, III | A01D 41/16 |
| 9,992,924 B2 * | 6/2018 | van Vooren | A01D 41/144 |
| 2002/0005033 A1 * | 1/2002 | Uhlending | A01D 75/287 56/10.2 R |
| 2002/0017090 A1 * | 2/2002 | Hockenbeck | A01B 63/32 56/16.2 |
| 2011/0179759 A1 * | 7/2011 | Goman | A01D 34/62 56/253 |
| 2012/0138321 A1 * | 6/2012 | Harris | A01B 59/064 172/810 |
| 2013/0298515 A1 * | 11/2013 | Lohrentz | A01D 41/141 56/51 |
| 2014/0212244 A1 * | 7/2014 | Meyer | E02F 3/3677 414/24.5 |
| 2014/0360149 A1 * | 12/2014 | Lohrentz | A01D 45/021 56/103 |
| 2016/0076217 A1 * | 3/2016 | Costello | E02F 3/422 60/533 |
| 2016/0278276 A1 * | 9/2016 | De Coninck | A01B 63/004 |
| 2016/0360698 A1 * | 12/2016 | Ducroquet | A01D 41/16 |

* cited by examiner

COTTON PICKER UNIT LIFT STRUCTURE

RELATED APPLICATIONS

This application is a divisional application of U.S. patent application Ser. No. 15/654,924, filed Jul. 20, 2017, the disclosure of which is hereby incorporated by reference in its entirety.

FIELD OF THE DISCLOSURE

The present disclosure relates to a lift structure for a cotton harvester, and in particular, to a pivotal lift structure for mounting several picker units.

BACKGROUND OF THE DISCLOSURE

Cotton harvesters often have a header with a number of picking units coupled to a lift frame for harvesting cotton. Each picking unit includes at least one drum, and on some units there may be a front drum and a rear drum. In any event, on each drum there is a number of picker bars and on each picker bar there are a plurality of spindles. Each spindle can be tapered and have a barbed surface for removing the cotton from the cotton plant. Each row unit includes a doffer column having a plurality of doffers for removing picked cotton from the spindles. A doffer is a disc that may be coated in rubber or urethane and rotatably driven at a velocity much greater than that of the spindles. In a conventional cotton harvester row unit, the spindles move underneath the bottom face of the doffers so that the cotton is unwrapped and stripped from the spindles.

Conventional 4, 5, and 6 row cotton harvesters typically use a lift frame that raises and lowers the right and left sides individually. This allows 2 or 3 row units to go up and down together to follow contours in the field independent of the other side. Each side is cantilevered out from a center mounting point, requiring a significant lift structure to support the corresponding row units.

Conventional headers require substantial modification to be separated from the cotton harvester. Many cotton harvesters require individually removing each row unit by uncoupling several mechanical, hydraulic, water, and/or electrical connections per row unit. Accordingly, conventional cotton harvesters are designed to be transportable on public roads without requiring the removal of the header and row units. Consequently, the number of row units on a conventional cotton harvester is limited because of the difficulty in removing the header and transport width limitations.

SUMMARY

One exemplary embodiment is a cotton picker unit lift structure, having a first frame, a second frame pivotally coupled to the first frame about a pivot axis, and at least one sliding joint coupling the first frame to the second frame. Wherein the sliding joint is not positioned at the pivot axis.

In one example of this embodiment, the at least one sliding joint further has an arcuate opening defined in the second frame, and a slider coupled to the first frame. Wherein the slider is restricted from movement other than sliding within the arcuate opening.

In another example, the second frame has a first header cross-member, and a second header cross-member coupled to the first header cross-member. Wherein the first and second header cross-members are configured to removably couple to a row unit. In one aspect of this example, the at least one sliding joint has a first sliding joint slidably coupling the first header cross-member to the first frame, and a second sliding joint slidably coupling the second header cross-member to the first frame.

Another example has a linear actuator pivotally coupled at a first end to the first frame and pivotally coupled at a second end to the second frame, wherein the linear actuator is articulable to pivot the second frame about the pivot axis relative to the first frame. One aspect of this example has a ground sensor positioned on a row unit, wherein the linear actuator articulates responsive to the proximity of the ground sensor to an underlying surface.

In yet another example the first frame further has at least one top link coupling the first frame to a work machine, at least one linear actuator coupling the first frame to the work machine, and a sub-frame pivotally coupling the first frame to the work machine. Wherein the top link adjusts fore and aft orientation of the lift structure and the linear actuator raises and lowers the lift structure relative to the work machine. In one aspect of this example, the at least one top link, the at least one linear actuator, and the sub-frame are coupled to the work machine with removable couplers.

Another example has a plurality of row units coupled to the second frame, the plurality of row units providing a single water connection, a single grease connection, and a single electrical connection, and a work machine providing water, grease, and electrical communication to the plurality of row units. Wherein the single water connection, single grease connection, and single electrical connection provides corresponding water, grease, and electrical communication to each of the plurality if row units.

In another example the second frame pivots from 4-8 degrees relative to the first frame.

Another embodiment may be a cotton harvester system that has a work machine with at least one ground engaging mechanism selectively moving the cotton harvester over an underlying surface and a cab containing a plurality of controls for the cotton harvester. The system may also have a header unit with a first frame configured to be removably coupled to the work machine, a second frame pivotally coupled to the first frame about a pivot axis, and a plurality of row units coupled to the header unit. Wherein the second frame selectively pivots relative to the first frame.

In one example, the first frame has a single water coupler and a single hydraulic coupler. Wherein the plurality of row units are all coupled to the work machine through the single water coupler and the single hydraulic coupler.

In another example, there is at least one sliding joint pivotally coupling the first frame to the second frame. Wherein, the at least one sliding joint comprises an arcuate opening defined in the second frame and a slider coupled to the first frame.

In yet another example, the second frame has a first header cross-member, a second header cross-member spaced from and coupled to the first header cross-member, a first sliding joint slidably coupling the second cross-member to the first frame, a second sliding joint slidably coupling the first cross-member to the first frame, and a third sliding joint slidably coupling the first cross member to the first frame.

Another example has a linear actuator pivotally coupled at a first end to the first frame and pivotally coupled at a second end to the second frame, wherein the linear actuator articulates to pivot the second frame about the pivot axis relative to the first frame.

Another example has a linkage assembly coupled to the first frame, at least one top link coupling the first frame to the work machine, at least one linear actuator coupling the first frame to the work machine, and a sub-frame pivotally coupling the first frame to the work machine. Wherein the top link adjusts fore and aft orientation of the header unit relative to the work machine and the linear actuator raises and lowers the header unit relative to the work machine. Another aspect of this example has a ground sensor positioned on at least one row unit, wherein the linear actuator articulates responsive to the proximity of the ground sensor to an underlying surface.

In one example the pivot axis is defined at a location away from the first frame and the second frame and towards the underlying surface.

Yet another embodiment is a cotton picker unit lift structure that has a first frame, a second frame having a first header cross-member and a second header cross-member, the second frame pivotally coupled to the first frame about a pivot axis, and at least one row unit coupled to the second frame. Wherein, the pivot axis is not oriented through the first frame or the second frame.

One example has a first sliding joint slidably coupling the first frame to the first header cross-member and a second sliding joint slidably coupling the first frame to the second header cross-member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
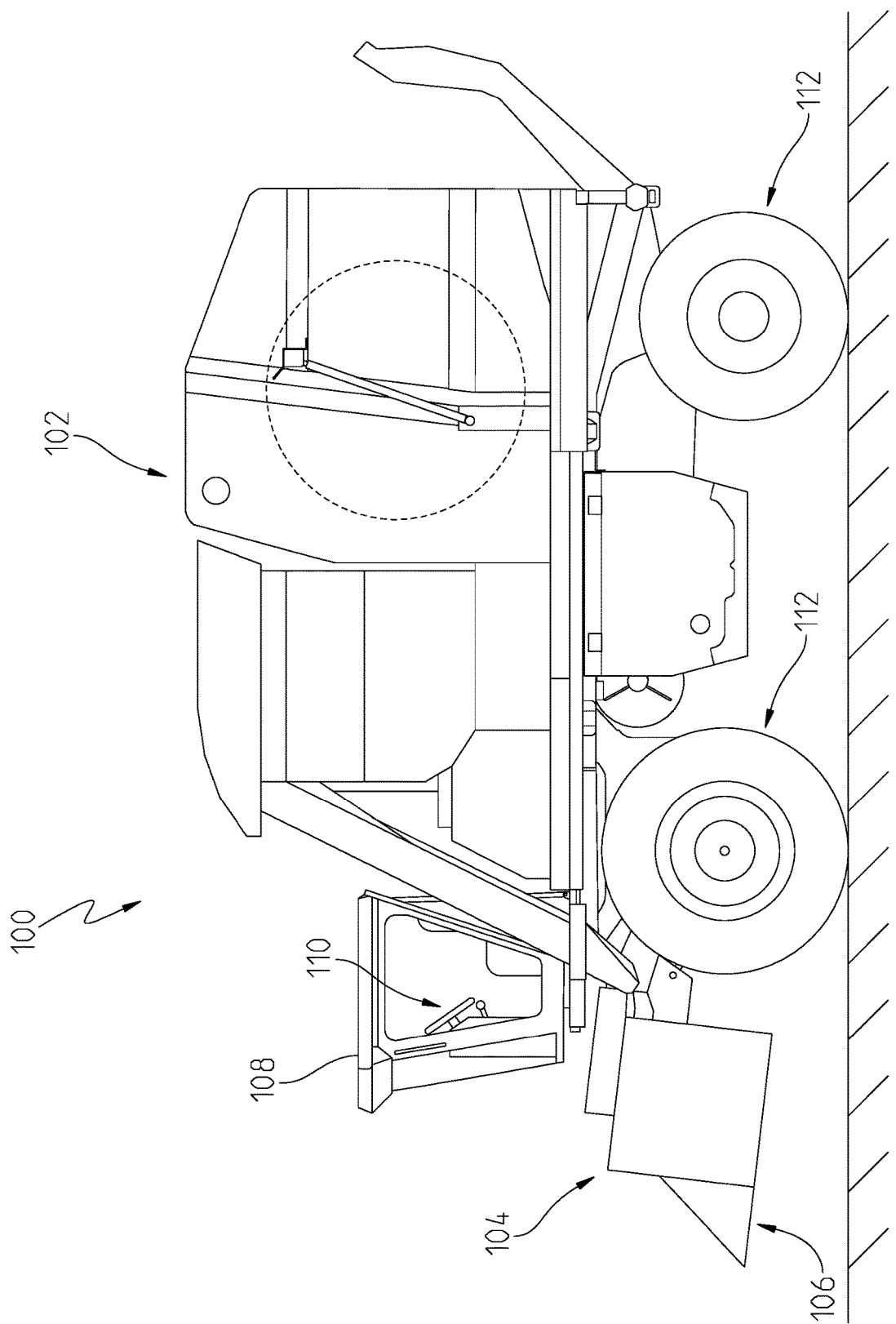
FIG. 1 is a side view of a cotton harvesting machine.

Referring to FIG. 1, a conventional cotton harvesting machine 100 is shown. The cotton harvesting machine 100 may have a work machine 102 coupled to a header unit 104. The work machine 102 may have a plurality of ground engaging mechanisms 112 such as wheels or tracks. Further, the header unit 104 may have a plurality of row units 106 positioned thereon. There may be any number of row units 106 and this disclosure is not limited to the precise number shown throughout.

The work machine 102 may also have a cab 108 coupled thereto. The cab 108 may be located to allow a user to access controls 110 of the cotton harvester 100 and thereby direct the harvesting process. The controls 110 may include inputs to manipulate the direction and speed of the cotton harvester, inputs to initiate a harvesting sequence on the header unit 104 (i.e. engage drums, doffers, and spindles of the row units), and inputs to raise and lower the header unit 104 among others.

In one embodiment, the controls may have inputs to release the header unit 104 from the work machine 102. In this embodiment, the header unit 104 may be lowered to an underlying surface and mechanical couplers may uncouple the work machine 102 from the header unit 104. Further, a single grease coupler, water coupler, and electrical coupler may be uncoupled between the header unity 104 and the work machine 102. Once the mechanical couplers, grease coupler, water coupler, and electrical coupler are uncoupled from the header unit 104, the work machine 102 may be separated from the header unit 104.

Figure 2:
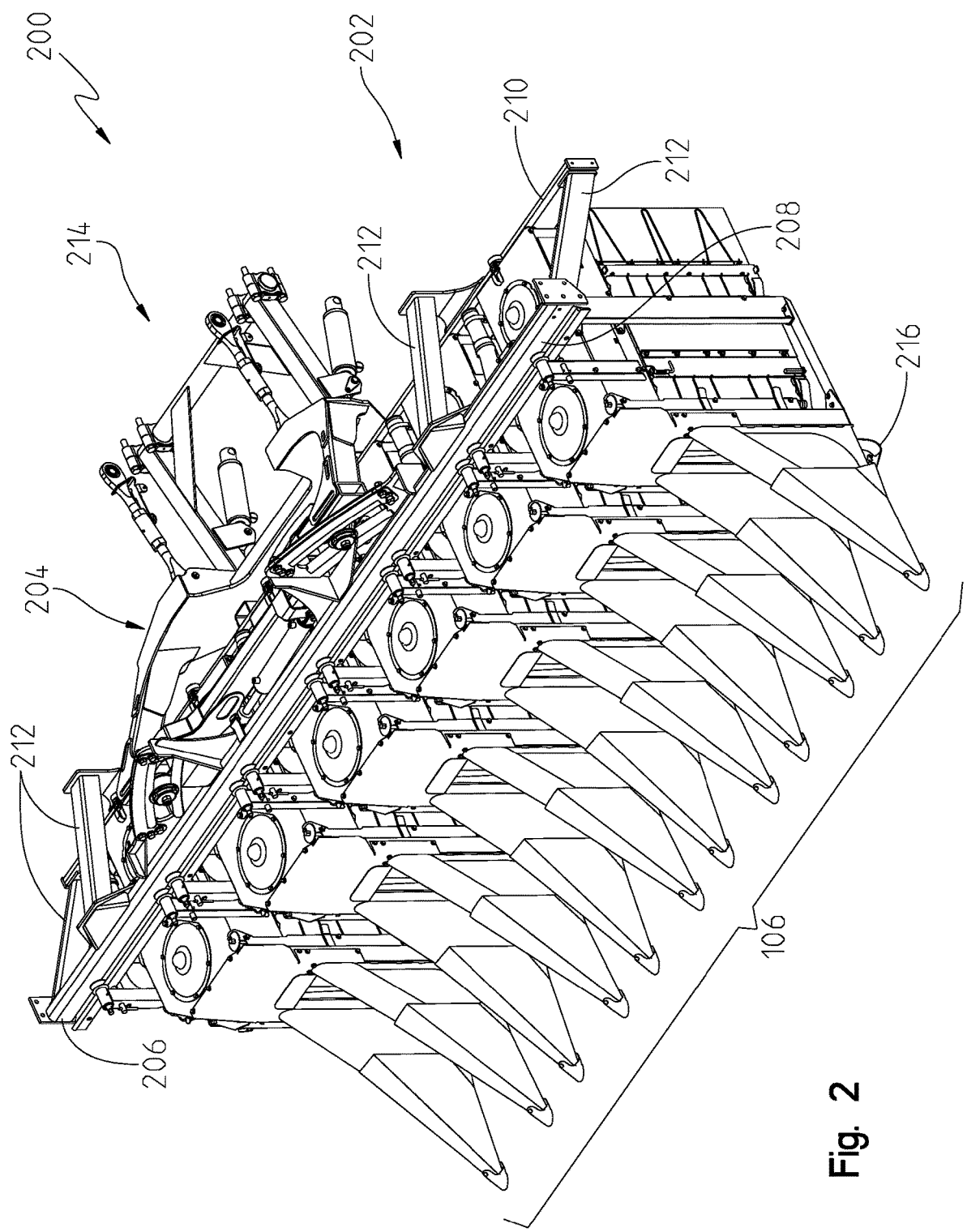
FIG. 2 is an elevated perspective view of a pivoting header unit.

Referring now to FIG. 2, one embodiment of a pivoting header unit 200 is illustrated. The pivoting header unit 200 may have a header frame assembly 202 that has an upper header frame or a first frame 204 pivotally coupled to a lower header frame or second frame 206. Further, the second header frame 206 may provide a first header cross-member 208 coupled to a second header cross-member 210 via cross-member couplers 212. The cross-member couplers 212 may rigidly couple the first header cross-member 208 spaced apart from the second header cross-member 210. Further, the first and second cross-members 208, 210 provide mounting locations for any number of row units 106. In the embodiment shown in FIG. 2, the second header frame 206 may pivot relative to the first header frame 204, thereby pivoting the row units 106 relative to the work machine 102 when coupled thereto.

A linkage assembly 214 is also illustrated in FIG. 2. The linkage assembly 214 may provide a location couple the pivoting header unit 200 to the work machine. More specifically, the linkage assembly may provide at least couplers to mechanically, hydraulically, and electrically couple the pivoting header unit 200 to the work machine 102. The linkage assembly 214 may have hydraulic components that respond to the controls 110 to allow the user to raise and lower the pivoting header unit 200 among other things. Further, in one embodiment, the linkage assembly 214 may allow the user to attach or remove the pivoting header unit 200 without the use of assisting tools. In other words, lock pins or other removable couplers may mechanically couple the linkage assembly 214 to the work machine 102, quick-connect type couplers may connect any required fluid lines, and an electrical coupler may couple any electrical components.

In one embodiment, one or more sensor 216 may be positioned on a bottom portion of one or more row units 106 proximate to the underlying surface. The sensor 216 may communicate with a controller or otherwise to the user the height of the row unit 106 relative to the underlying surface.

As will be described in more detail below, the sensors 216 may monitor and help control the angle of the second header frame 206 relative to the first header frame 204 to ensure that the row units 106 remain properly aligned with the underlying surface.

Figure 3:
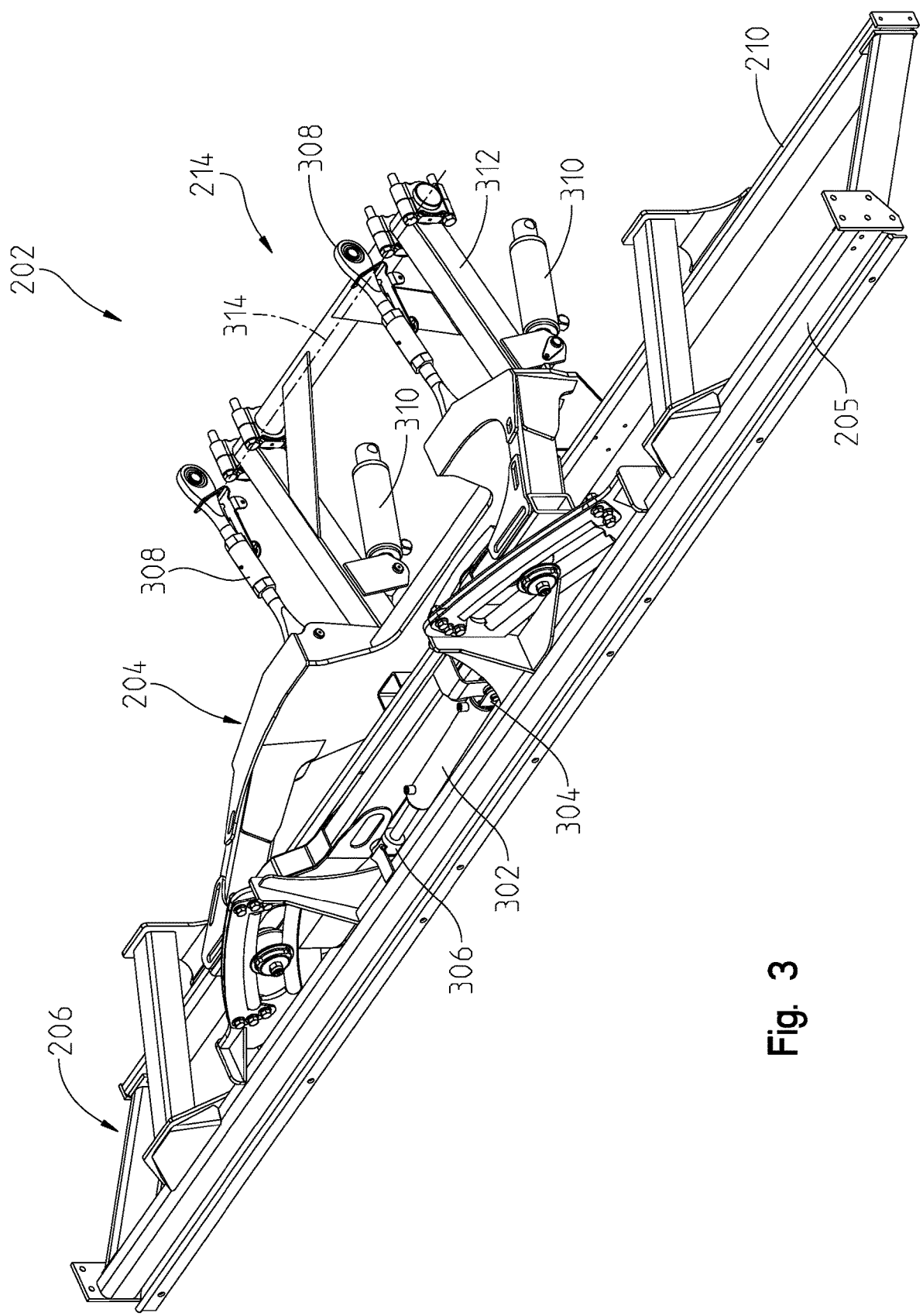
FIG. 3 is an elevated perspective view of a header frame assembly.

Now referring to FIG. 3, the header frame assembly 202 is shown isolated from the row units 106 and the work machine 102. Also shown in FIG. 3 is a header angle linear actuator 302 or position cylinder. The linear actuator 302 may be pivotally coupled to the first header frame 204 on a first end 304 and pivotally coupled to the second header frame 206 on a second end 306. Further, the linear actuator 302 can alter the distance between the first end 304 and the second end 306 as is known in the art. As the linear actuator 302 alters the distance between the first and second ends 304, 306, the angle of the second header frame 206 relative to the first header frame 204 may be altered.

The header angle linear actuator 302 may be any type of linear actuator known in the art, and this disclosure is not limited to any particular type of linear actuator and contemplates other devices in place of the linear actuator. More specifically, the linear actuator 302 may be a hydraulic or pneumatic linear actuator having a piston positioned within a cylinder and driving a shaft. The axial location of the piston, and thereby the shaft, may be controlled by hydraulic or pneumatic pressure. Alternatively, the linear actuator may be air bags configured to alter the positioning of the second header frame 206 relative to the first header frame 204 based on the amount of air pressure provided to the corresponding air bag. In yet another embodiment, a rack and pinion gear set may be used instead of any of the above-described devices. The rack gear may be positioned on the second header frame 206 and the pinion gear may be driven by a motor coupled to the first header frame 204 or vice versa. Accordingly, any known method of altering a linear distance between two points could be used and this disclosure is not limited to any particular one.

Also shown in more detail in FIG. 3 is the linkage assembly 214. The linkage assembly 214 may have at least one top link 308 coupled to the first header frame 204 on one end and configured to be coupled to the work machine 102 on the other end. The top link 308 may be adjustable to alter the angular orientation of the header frame assembly 202 in the fore 412 or aft 414 (see FIG. 4) direction.

The linkage assembly 214 may also have at least one lift cylinder 310 coupled to the first header frame 204 on one end and configured to be coupled to the work machine 102 on the other end. In one embodiment, the lift cylinder 310 may be a hydraulic cylinder that is controlled by the controls 110. The lift cylinder 310 may be engaged by the user utilizing the controls 110 to transition the header frame assembly 202 between a raised position and a lowered position (not particularly shown). The user may transition the header frame assembly 202 to the raised position via the lift cylinder 310 to allow for transporting the cotton harvesting machine 100. Alternatively, when the user wants to initiate a cotton harvesting sequence, the user may lower the header frame assembly 202 via the lift cylinder 310 to allow the row units 106 to be aligned with the crop to be harvested.

To provide additional support to the header frame assembly 202, a sub-frame 312 may also be pivotally coupled to the first header frame 204 on one end and configured to be coupled to the work machine 102 on the other end. The sub-frame 312 may define a lift axis 314 about which the header frame assembly 202 pivots as it transitions between the raised and lowered position.

Figure 4:
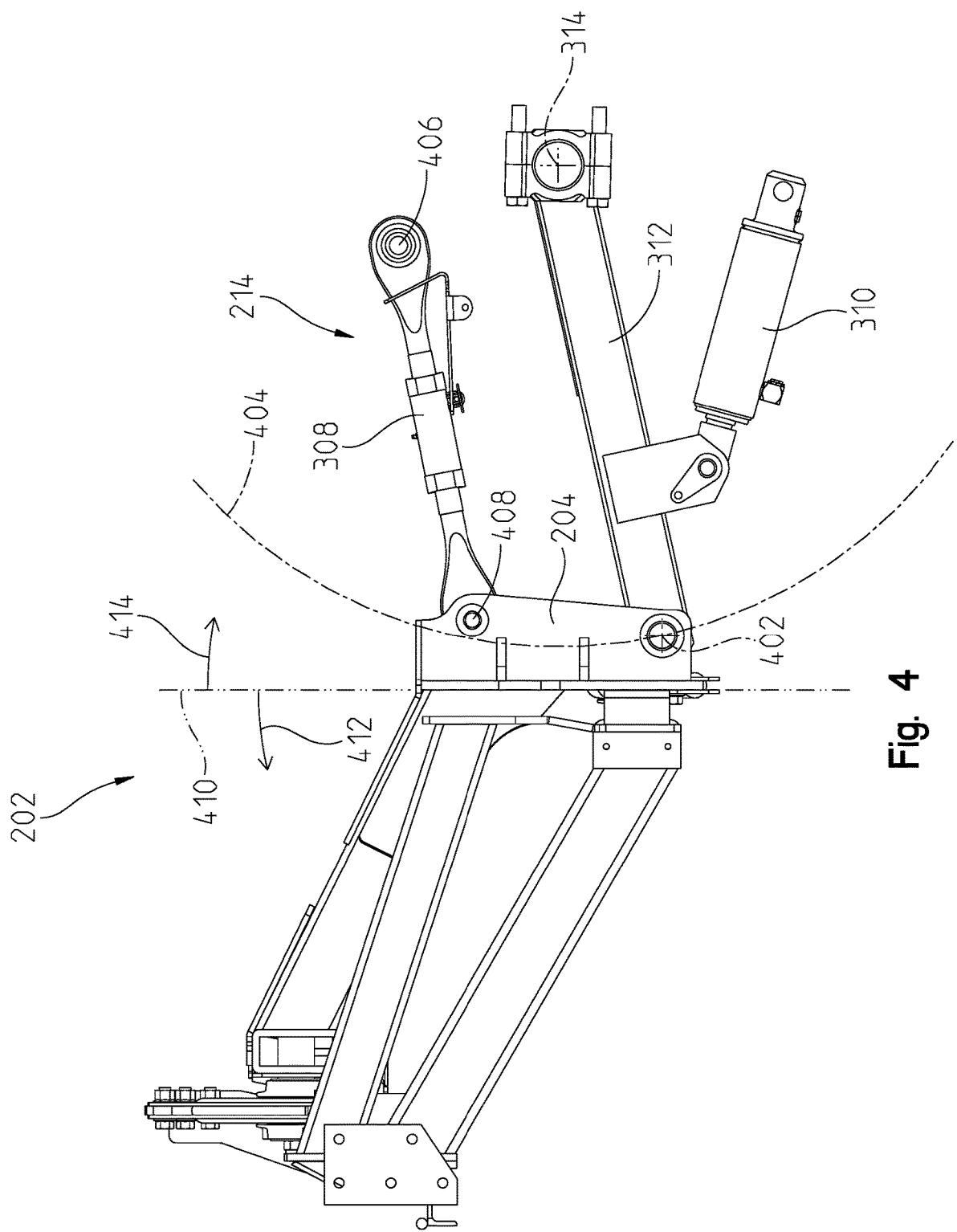
FIG. 4 is a side view of the header frame assembly of FIG. 3.

Referring now to FIG. 4, a side view of the header frame assembly 202 is illustrated. More specifically shown is the pivotal relationship of the linkage assembly 214. As mentioned earlier, the header frame assembly 202 may rotate about the lift axis 314. When the pivoting header unit 200 is coupled to the work machine 102, the lift axis 314 is defined through a portion of the work machine 102 and one end of the sub-frame 312 may be pivotally coupled therearound. As the lift cylinder 310 articulates, a distal end 402 of the sub-frame 312 may move along an arcuate path 404 as the distal end 402 of the sub frame 312 pivots about the lift axis 314. Further, the distal end 402 may be pivotally coupled to the first header frame 204.

In the embodiment illustrated in FIG. 4, the top link 308 may be utilized to maintain proper alignment of the header frame assembly 202 as it transitions between the raised and lowered position. More specifically, the top link 308 may be pivotally coupled to the work machine 102 at a first end 406 and pivotally coupled to the first header frame 204 at a second end 408. As the lift cylinder 310 rotates the header frame assembly 202 about the lift axis 314, the top link 308 ensures that the first header frame 204 remains in proper orientation with the underlying surface. More specifically, the top link 308 may have adjustable lengths between the first and second ends 406, 408. Adjusting the length of the top link 308 may, in turn, alter a substantially vertical plane 410 of the first header frame 204. The vertical plane 410 may be altered in the fore direction 412 or the aft direction 414 about the distal end 402 of the sub-frame 312 based on the selected length of the top link 308.

The top link 308 may be a mechanically adjustable turnbuckle type mechanism or it may be a linear actuator that implements pneumatic, hydraulic, or electrical power to alter the distance between the first end 406 and the second end 408. Accordingly, this disclosure is not limited to any particular type of top link 308 but rather considers many different structures for altering the length of the top link 308. In a different embodiment, the top link 308 may not have adjustable lengths at all. In yet another embodiment, the user may alter the top link utilizing the controls 110.

While the second header frame 206 is described as pivotable relative to the first header frame 204, the second header frame 206 is not substantially pivotable relative to the first header frame in the fore 412 and aft 414 directions. In other words, not only does the lift cylinder 310 and the top link 308 move the first header frame 204 as described above, the fore 412 and aft 414 position of the second header frame 206 is also moved in substantially the same way. In the embodiment illustrated in FIG. 5, second header frame 206 is pivotable relative to the first header frame 204 in a clockwise 524 and counter-clockwise 526 that is substantially perpendicular to the fore/aft direction 412, 414.

Figure 5:
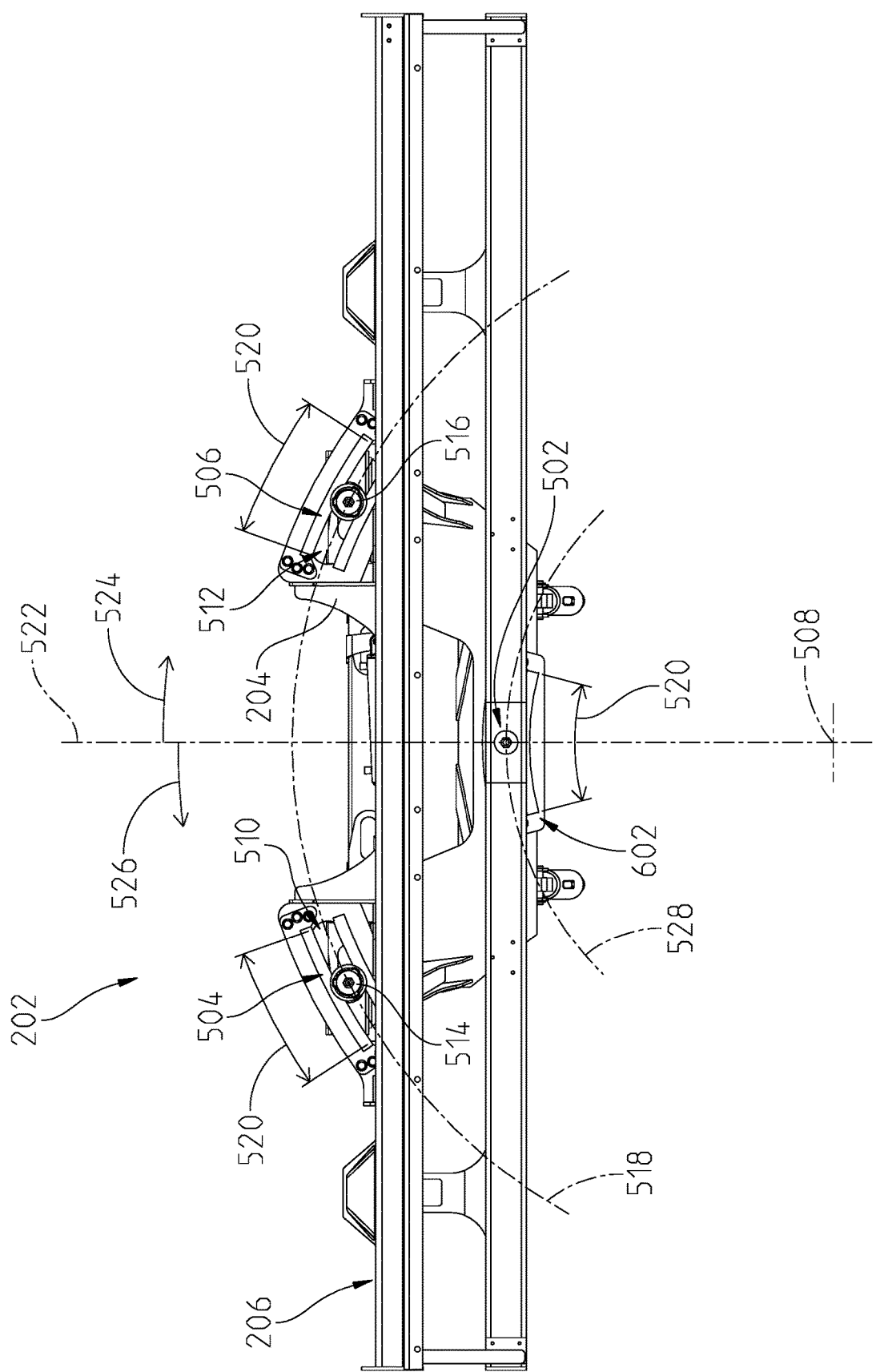
FIG. 5 is a front view of the header frame assembly of FIG. 3.
Figure 6:
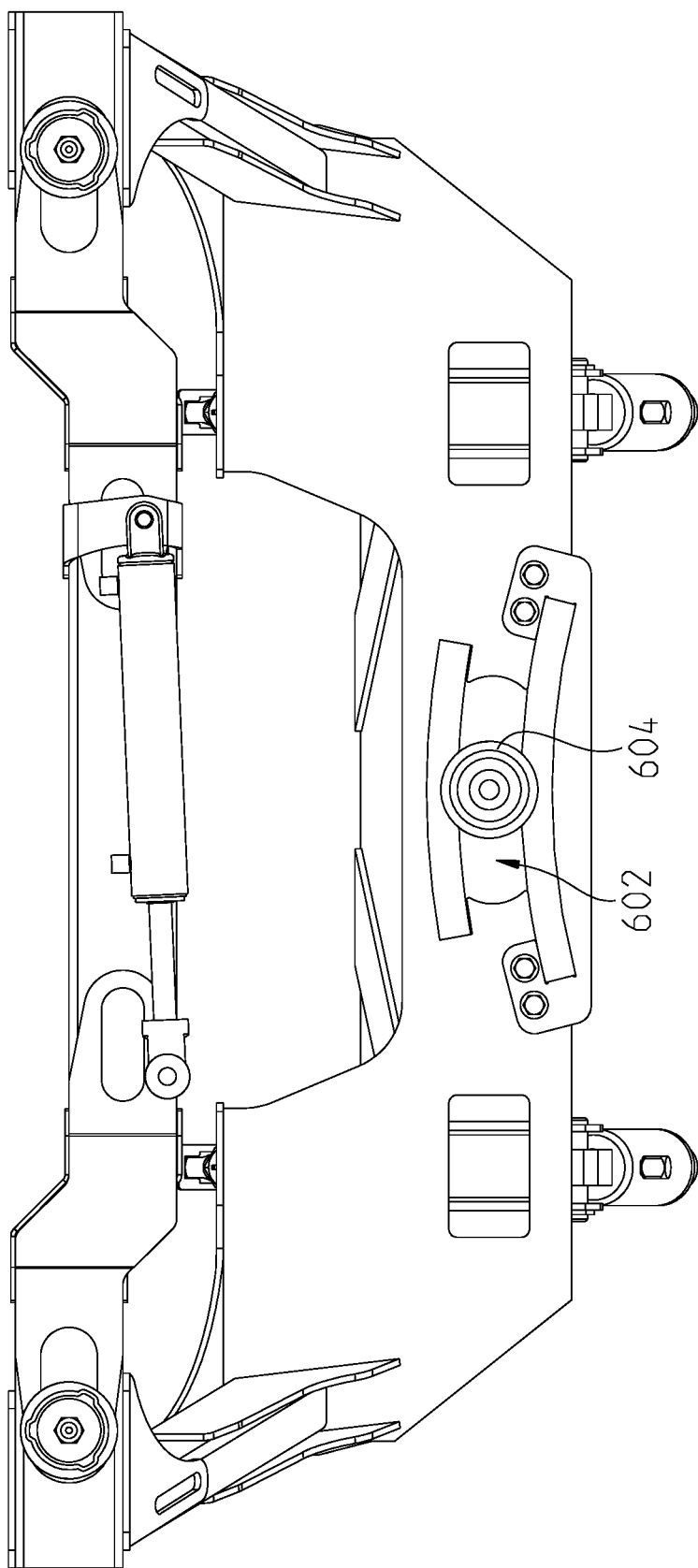
FIG. 6 is a front view of an upper header frame.

FIG. 5 illustrates a front view of the header frame assembly 202 with the row units 106 removed. More specifically, shown in FIG. 5 is a first, second, and third sliding joint 502, 504, 506 defined between the first header frame 204 and the second header frame 206. The first sliding joint 502 may have a first arcuate slot 602 (see FIG. 6) defined in the first header frame 204 and be coupled to the second header frame 206 through a first slider or roller 604 (FIG. 6). The first arcuate slot 602 may be defined along a first arc-shaped path 528. The first arc-shaped path 528 may be a semi-circular path defined about a pivot point 508. Accordingly, the second header frame 206 may slide about the first sliding joint 502 and rotate relative to the first header frame 204 about the pivot point 508.

The second and third sliding joint 504, 506 may have a second and third arcuate slot 510, 512 respectively defined in the second header frame 206 and is coupled to the first header frame 204 through a second and third slider or roller 514, 516 respectively. The second and third arcuate slots 510, 512 may be defined along a second arc-shaped path 518. The second arc-shaped path 518 may be a semi-circular path defined about pivot point 508 but have a greater radius than the first arc-shaped path 528. Accordingly, the second header frame 206 may slide about the first, second, and third sliding joints 502, 504, 506 and rotate relative to the first header frame 204 about the pivot point 508.

In the embodiment shown in FIG. 5, the arcuate slots 602, 510, 512 may each be defined along an arc-length 520. The arc-lengths 520 of the respective sliding joints 502, 504, 506 may define the rotational limits of the second header frame 206 relative to the first header frame 204. More specifically, when the respective rollers 604, 514, 516 are positioned along a midpoint of their respective arcuate slot 602, 510, 512, the second header frame 206 is aligned with the first header frame 204 along a central plane 522. However, the sliding joints 502, 504, 506 may be configured to allow the second header frame 206 to pivot in a clockwise direction 524 or a counter-clockwise direction 526 relative to the first header frame 204.

Figure 10:
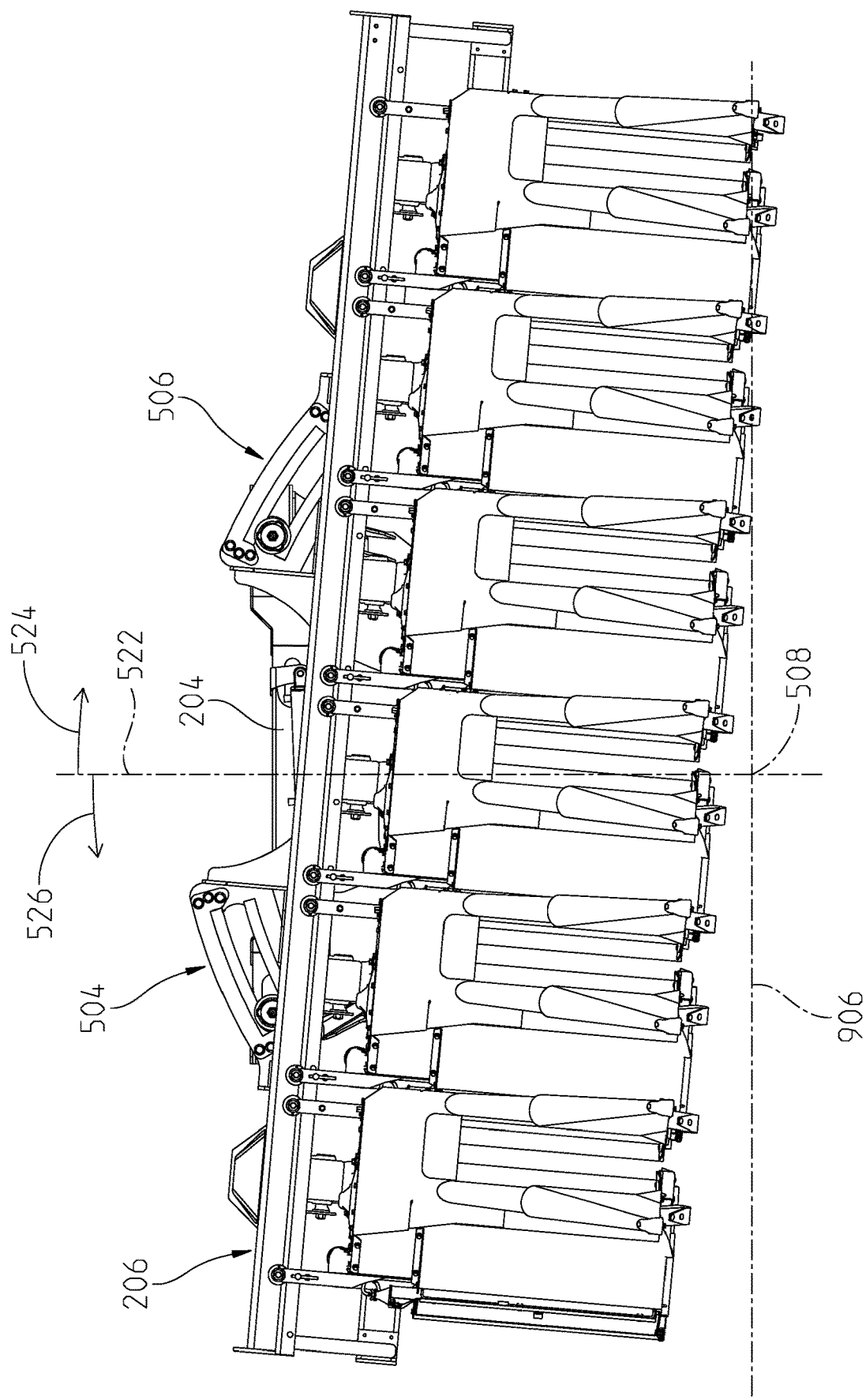
FIG. 10 is a front view of the pivoting header unit of FIG. 2 pivoted in a counter-clockwise direction.
Figure 11:
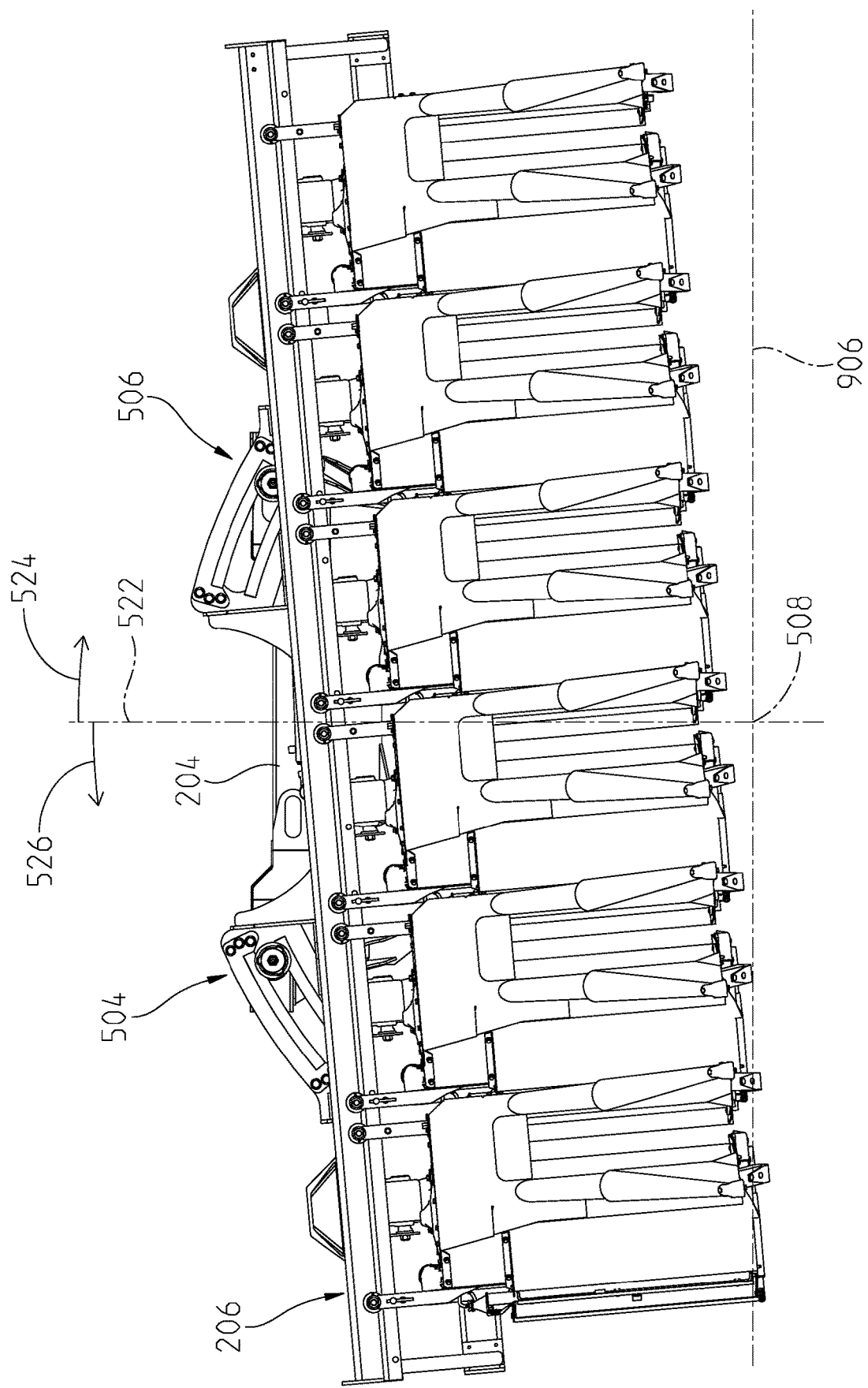
FIG. 11 is a front view of the pivoting header unit of FIG. 2 pivoted in a clockwise direction.

When the second header frame 206 pivots in the counter clockwise direction 526, the respective rollers 604, 514, 516 may become positioned outside of the midpoint of their respective arcuate slot 602, 510, 512, thereby allowing the second header frame 206 to pivot in the counter-clockwise direction 526 relative to the first header frame 204 as shown in FIG. 11. Similarly, when the second header frame 206 pivots in the clockwise direction 524, the respective rollers 604, 514, 516 may become positioned outside of the midpoint of their respective arcuate slot 602, 510, 512 in an opposite direction as when pivoted in the counter-clockwise direction 526 as illustrated in FIG. 10.

As described above, the arcuate slots 602, 510, 512 may ultimately be defined about the pivot point 508. In this embodiment, the second header frame 206, and any row units 106 coupled thereto, also rotate about the pivot point 508 when the second header frame 206 pivots relative to the first header frame 204. Further, the arc-length 520 may define the parameters or rotational limits for the second header frame 206 relative to the first header frame 204. For example, the second header frame 206 may pivot counterclockwise 526 until the first, second, and third rollers 604, 514, 516 are at a first end of the respective arcuate slots 602, 510, 512, thereby restricting further counter-clockwise 526 rotation of the second header frame 206. Similarly, the second header frame 206 may pivot clockwise 524 until the first, second, and third rollers 604, 514, 516 are at a second end of the respective arcuate slots 602, 510, 512, thereby restricting further clockwise 524 rotation of the second header frame 206. Accordingly, in one embodiment, the arc-length 520 of the respective arcuate slots 602, 510, 512 may determine the amount of rotation permitted between the second header frame 206 and the first header frame 204.

In one embodiment, the header angle linear actuator 302 may alter the location of the first, second, and third rollers 604, 514, 516 in their respective arcuate slots 602, 510, 512. As described above, the header angle linear actuator 302 is coupled to the first header frame 204 on a first end 304 and to the second header frame 206 on the second end 306. The header angle linear actuator 302 may be transversely positioned between the first and second header frame 204, 206 in such an orientation that allows the actuator 302 to selectively move the second header frame 206 in the clockwise 524 or counter-clockwise 526 directions.

Figure 7:
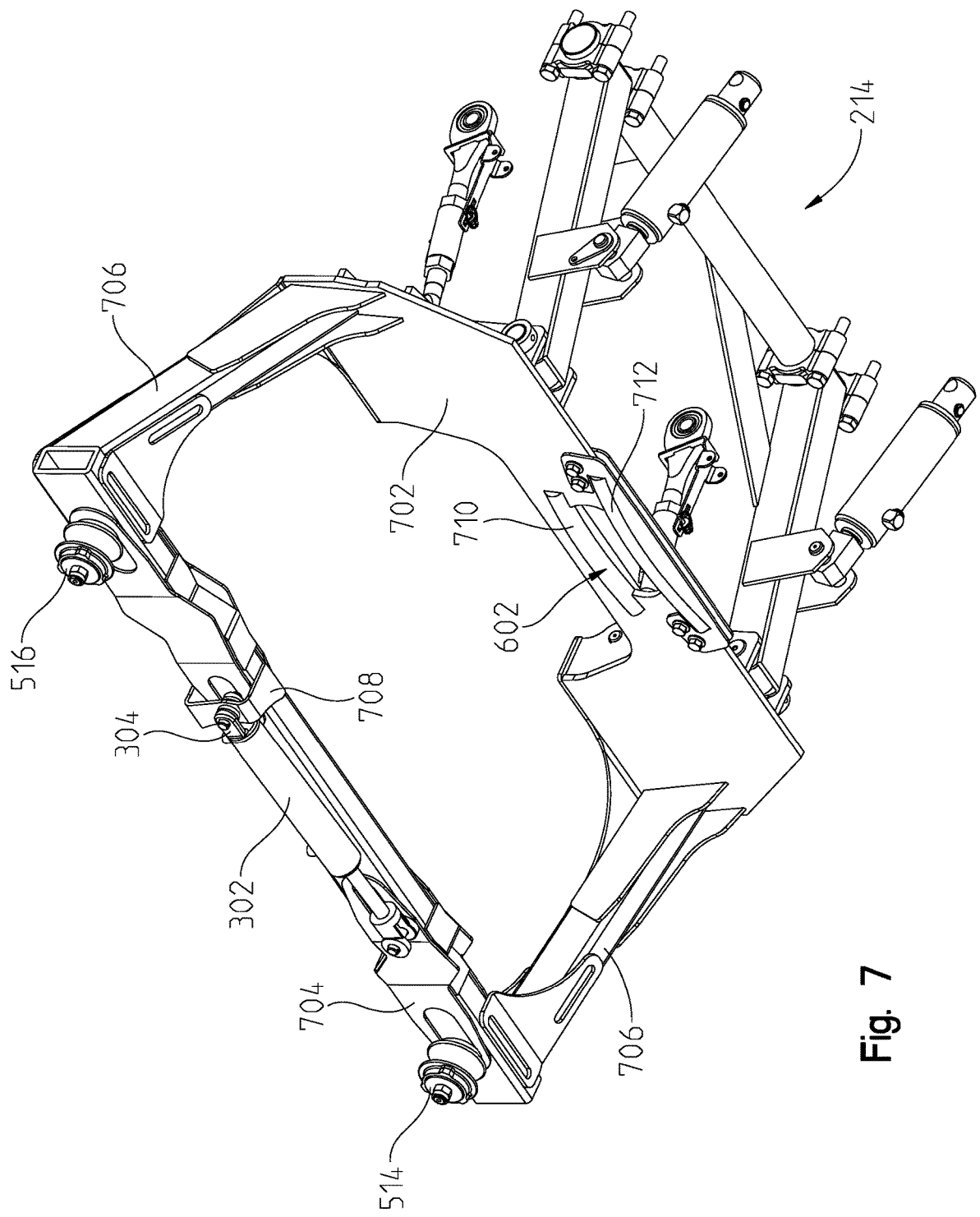
FIG. 7 is a lowered perspective view of the upper header frame of FIG. 6.

Referring now to FIG. 7, the first header frame 204 is illustrated isolated from the second header frame 206. In FIG. 7, a linkage plate 702 is shown coupled to an outer frame portion 704 via extension couplers 706. The linkage plate 702 provides a structural base to couple the linkage assembly 214 to the remaining portions of the first header frame 204. Further, the extension couplers 706 extend away from the linkage plate 702 and the linkage assembly 214 and are coupled to the outer frame portion 704. The outer frame portion 704 may provide a structural location to couple the second and third rollers 514, 516 to the first header frame 204. Further, the outer frame portion 704 may provide a structural location to couple the first end 304 of the linear actuator 302. In one embodiment, a linear actuator coupler 708 is coupled to the outer frame portion 704 to provide a location to pivotally couple the linear actuator 302. In a different embodiment, the linear actuator 302 is pivotally coupled directly to the outer frame portion 704.

Also more clearly shown in FIG. 7 is the first arcuate slot 602. The first arcuate slot 602 may have an upper rail 710 and a lower rail 712 coupled to, or integrally formed with, the linkage plate 702. In one embodiment, the lower rail 712 is removably coupled to the linkage plate 702. In this embodiment, the lower rail 712 may be removed from the linkage plate 702 and the first roller 604 can be positioned within the first arcuate slot 602. The lower rail 712 may then be coupled to the linkage plate 702 with the first roller 604 positioned therein. Once the lower rail 712 is coupled to the linkage plate 702 with the first roller 604 positioned therein, the first roller 604 may be substantially restricted from movement outside of the arcuate slot 602. In other words, the lower rail 712 is removable to allow the first roller 604 to become positioned within the first arcuate slot 602.

Figure 8:
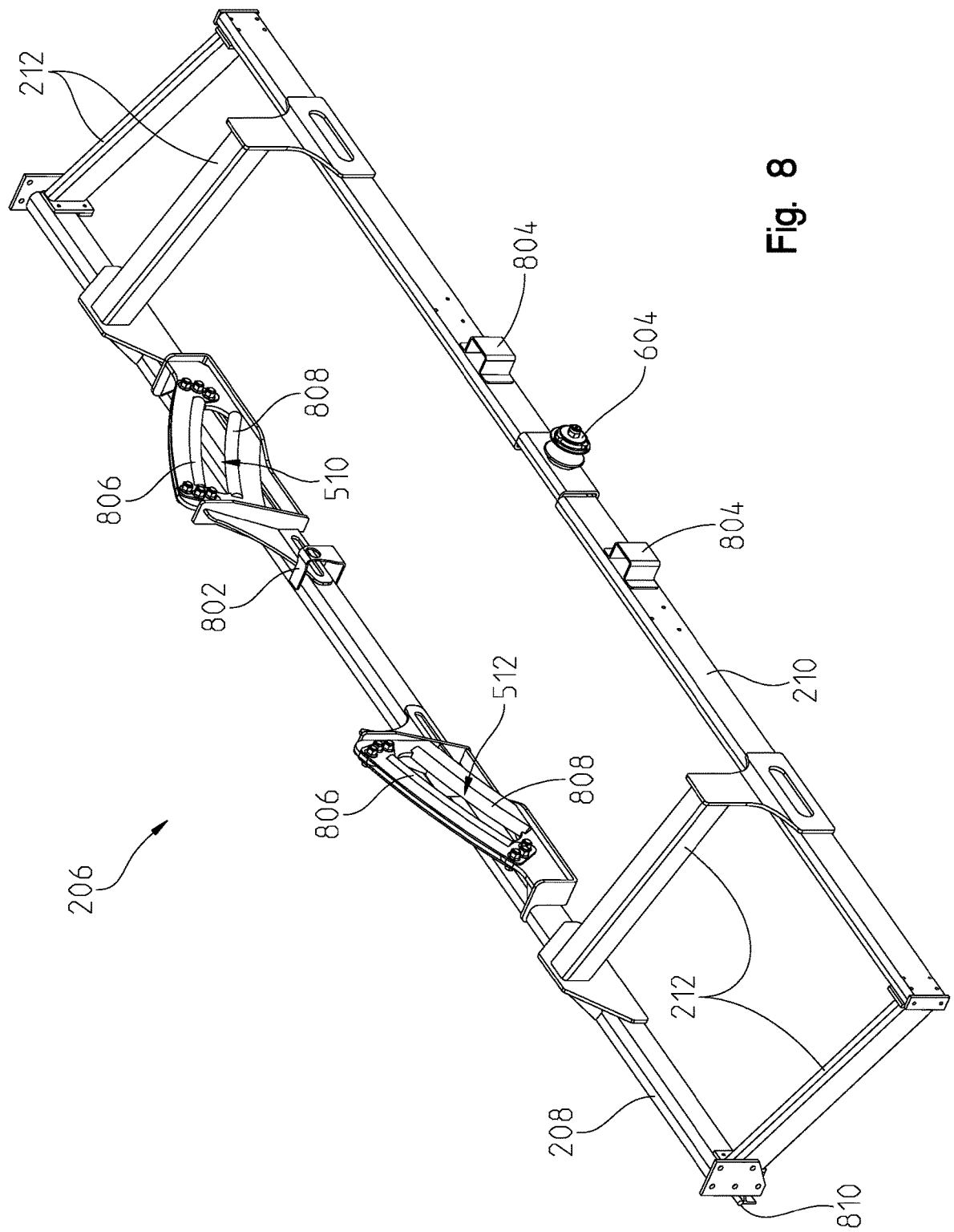
FIG. 8 is an elevated perspective view of a lower header frame.

Referring now to FIG. 8, the second header frame 206 is illustrated isolated from the remaining components of the cotton harvesting machine 100. Along the second header cross-member 210 may be one or more spacer 804 configured to space the second header frame 206 from the first header frame 204 when coupled thereto. More specifically, there may be a spacer 804 positioned on either side of the first roller 604. The spacers 804 may be sized to contact a portion of the first header frame 204 when the first roller 604 is positioned within the first arcuate slot 602. The spacers 804 may be fixedly coupled to, integrally formed in, or removably coupled to the second header cross-member 210. The spacers 804 may have a low friction surface coating to allow the second header frame 206 to pivot relative to the first header frame 204 during contact between the spacers 804 and the first header frame 204.

The second and third arcuate slot 510, 512 may also have an upper rail 806 and a lower rail 808. The upper and lower rail 806, 808 may be coupled to the second header frame 206 to define the upper and lower portions of the corresponding second and third arcuate slot 510, 512. The upper rails 806 may be removably coupled to the second header frame 206 similarly to the lower rail 712 of the first header frame 204. More specifically, the upper rails 806 may be removed to allow the second and third rollers 514, 516 of the first header frame 204 to become positioned within the respective second and third arcuate slots 510, 512. Once the second and third rollers 514, 516 are positioned within the second and third arcuate slots 510, 512, the upper rails 806 may be coupled thereto, positioning the rollers 514, 516 in the respective slot 510, 512.

Also illustrated in FIG. 8 is a linear actuator coupler 802 coupled to the first header cross-member 208. The linear actuator coupler 802 may be positioned along the second header frame 206 at a location spaced from the linear actuator coupler 708 of the first header frame 204. Further the linear actuator coupler 802 may be pivotally coupled to one end of the linear actuator 302 as described above.

In one embodiment, the second header frame 206 may be coupled to the first header frame 204 by selectively coupling corresponding rail components of the arcuate slots 602, 510, 512. More specifically, the lower rail 712 of the first arcuate slot 602 and the upper rails of the second and third arcuate slots 510, 512 may be removed. The first roller 604 may be positioned within the first arcuate slot 602 and the second and third rollers 514, 516 may be positioned in the second and third arcuate slots 510, 512. Then, the lower rail 712 may be coupled to the first header frame 204 thereby retaining the first roller 604 within the first arcuate slot 602. Similarly, the upper rails 806 may be coupled to the second header frame 206 thereby retaining the second and third rollers 514, 516 within the respective second and third arcuate slots 510, 512. Once the rollers 604, 514, 516 are coupled within their respective arcuate slots 602, 510, 512, the second header frame 206 may pivot about the first header frame 204 as the rollers 604, 514, 516 slide or roll within the respective arcuate slots 602, 510, 512.

While arcuate slots 602, 510, 512 are described herein, in one embodiment the sliding joints 502, 504, 506 may not be arcuate. In this embodiment the respective sliding joints may be formed of one or more substantially linear rails coupled to one another at an angle. The linear rails may be coupled to one another at an angle that allows the opening of the corresponding joint to remain substantially within the respective first or second arc-shaped path 528, 518. In this embodiment, the angled connection between the substantially linear rails may also act as a detent for the header frame assembly 202. In other words, when the second header frame 206 is in an aligned position with the first header frame 204, the rollers 604, 514, 516 may be position within the detent, thereby biasing the header frame assembly 202 to the aligned position.

In one aspect of the present disclosure, the second header frame 206 may provide one or more row unit rails 810 configured to couple one or more row units 106 to the second header frame 206. The row unit rails 810 may be integrally formed with, or coupled to, the corresponding first and second header cross-member 208, 210. Further, the row unit rails 810 may extend substantially the entire width of the second header frame 206. In this configuration, a row unit 106 may be selectively positioned at any location along the second header frame 206. Further, a row unit 106 may slide along the row unit rails 810 from one side of the second header frame 206 to the opposite side of the second header frame 206 without being removed from the row unit rails 810.

Figure 9:
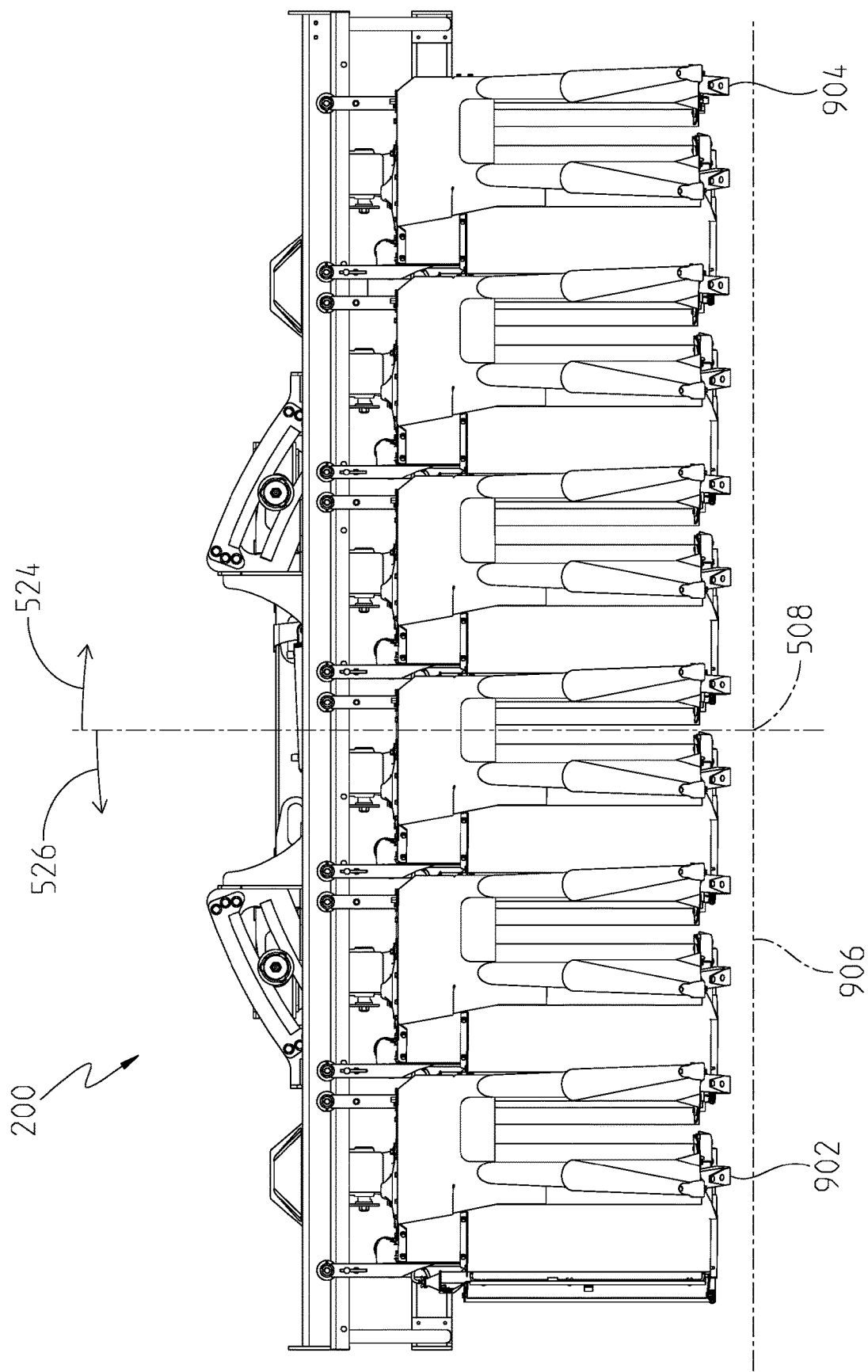
FIG. 9 is a front view of the pivoting header unit of FIG. 2.

In another aspect of the present embodiment, a controller may communicate with the sensors 216 positioned on the one or more row unit 106 to determine the relationship of the corresponding row unit compared to the underlying surface. More specifically, FIG. 9 illustrates a first sensor 902 and a second sensor 904 positioned on row units 106 on opposite sides of the pivoting header unit 200. The first and second sensor 902, 904 may communicate to the controller the height of the corresponding row unit relative to an underlying surface 906. In this embodiment, the controller may manipulate the header angle linear actuator 302 to alter the angle of the second header frame 206, and thereby the row units 106 coupled thereto, so the distance from the underlying surface 906 remains substantially the same on both sides of the pivoting header unit 200. In other words if the first sensor 902 becomes positioned closer to the underlying surface than the second sensor 904, the controller may pivot the second header frame 206 in the clockwise direction 524 until both the first sensor 902 and the second sensor 904 are about the same distance from the underlying surface.

In one embodiment, the controller may utilize the sensors 902, 904 to alter the second header frame 206 angle via the actuator 302 as described above. In a different embodiment, the user may adjust the angle of the second header frame 206 relative to the first header frame 204 via the controls 110. In this embodiment, the sensors 902, 904 may display to the user the height of the row units from the underlying surface 906. Then, the user may utilize the controls 110 to alter the angle of the second header frame 206 relative to the first header frame 204.

In one embodiment, the second header frame 206 may pivot relative to the first header frame 204 about the pivot point 508 about 4-8 degrees in the clockwise direction 524 and 4-8 degrees in the counter-clockwise direction 526. In yet another embodiment, the second header frame 206 may pivot relative to the first header frame 204 about the pivot point 508 about 6 degrees in the clockwise direction 524 and about 6 degrees in the counter-clockwise direction 526. However, this disclosure is not limited to the amount of rotation disclosed herein. Rather, other embodiments are considered where the second header frame 206 rotates more than 8 degrees relative to the first header frame 204 in both the clockwise 524 and the counter-clockwise 526 direction.

The linkage assembly 214 and a drive shaft for the row units 106 may be removably coupled to the work machine 102 without the use of special tools. More specifically, the connections may be of the type that a typical adult person would have sufficient strength to couple and uncouple the entire pivoting header unit 200 without utilizing any tools. The mechanical connections may utilize lock pins and the like, the fluid connections may utilize quick-disconnect fasteners, and the electrical connections may be consolidated at a single harness coupler positioned around the linkage assembly 214. As one non-exclusive example, the water line could be coupled with a cam latch coupler. In this embodiment, each header unit 104 may have a grease and a water line coupled to a trunk grease line and a trunk water line with a Tee fitting running across the back of the row units 106. Each of the trunk water line and the trunk grease line may have a single line going out through a quick connect as described above.

In one embodiment, the air ducts may be uncoupled from the row units 106 as well. In this embodiment, the work machine 102 may have a fixed bar coupled thereto. The fixed bar may provide structural support for the air ducts when they are removed from row units 106. Alternatively, in another embodiment there could be a strap or hook to secure a lower portion of the air duct to an upper portion of the air duct. The air ducts may telescope into a store position and the strap or hook may lock it in place.

While rollers 604, 514, 516 and arcuate slots 602, 510, 512 are shown and described at corresponding locations of the first header frame 204 and second header frame 206, the particular locations disclosed are not limiting. More specifically, while an arcuate slot may be described as defined in the first header frame and correspond to a roller in the second header frame, positioning the slot and roller in the opposite first and second header frame portions is also considered herein. Further, while rollers 604, 514, 516 have been described throughout, this disclosure considers utilizing sliders instead. The sliders may take the place of the rollers 604, 514, 516 and not roll at all but rather slide within a corresponding arcuate slot. Alternatively, the rollers 604, 514, 516 may pivot about bearings to allow the frames 204, 206 to pivot relative to one another.

In one embodiment, a lockout mechanism may be positioned between the first and second header frame 206, 204. The lockout mechanism may have an engaged position and a disengaged position. When the lockout mechanism is in the engaged position, the second header frame 206 may be substantially restricted from pivotal movement relative to the first header frame 204. In one embodiment, the lockout mechanism is a pin that is positionable in a through hole of both the first and second header frame 204, 206 when they are aligned with one another. In this embodiment, when the pin is positioned through the corresponding through-hole of each of the first and second header frame 204, 206, the header frame assembly will be locked. However, if the pin is removed from the one of the corresponding through-holes the header frame assembly may pivot as described above.

While one particular type of lockout mechanism is described above, this disclosure is not limited to such a mechanism but rather considers other lockout devices as well. More specifically, a hydraulic or mechanical brake can be positioned between the first and second header frame 204, 206 to restrict relative movement. Further, in another embodiment a wedge may be positioned between the first and second header frame 204, 206 to restrict relative movement. Accordingly, this disclosure is not limited to any particular lockout mechanism.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cotton harvester system, comprising:
a work machine comprising:
at least one ground engaging mechanism for moving the work machine over an underlying surface; and
a cab containing a plurality of controls for the work machine; and
a header unit, comprising:
a header frame assembly comprising:
a first frame removably coupled to the work machine; and
a second frame pivotally coupled to the first frame about a pivot axis; and
a plurality of row units coupled to the header frame assembly;
wherein the second frame selectively pivots relative to the first frame in response to manipulation of the plurality of controls; and
wherein the pivot axis is not oriented through the first frame or the second frame.

2. The cotton harvester system of claim 1, further wherein the first frame comprises:
a single water coupler; and
a single hydraulic coupler;
wherein the plurality of row units are is coupled to the work machine through the single water coupler and the single hydraulic coupler.

3. The cotton harvester system of claim 1, further comprising:
at least one sliding joint pivotally coupling the first frame to the second frame;
wherein, the at least one sliding joint comprises an arcuate opening defined in the second frame and a slider coupled to the first frame.

4. The cotton harvester system of claim 1, wherein the second frame further comprises:
a first header cross-member;
a second header cross-member spaced from and coupled to the first header cross-member;
a first sliding joint slidably coupling the second cross-member to the first frame;
a second sliding joint slidably coupling the first cross-member to the first frame; and
a third sliding joint slidably coupling the first cross member to the first frame.

5. The cotton harvester system of claim 1, further comprising a linear actuator pivotally coupled at a first end to the first frame and pivotally coupled at a second end to the second frame, wherein the linear actuator articulates to pivot the second frame about the pivot axis relative to the first frame.

6. The cotton harvester system of claim 1, further comprising:
a linkage assembly coupled to the first frame
at least one top link coupling the first frame to the work machine;
at least one linear actuator coupling the first frame to the work machine; and
a sub-frame pivotally coupling the first frame to the work machine;
wherein the top link adjusts fore and aft orientation of the header unit relative to the work machine and the linear actuator raises and lowers the header unit relative to the work machine.

7. The cotton harvester system of claim 5, further comprising a ground sensor positioned on at least one row unit of the plurality of row units, wherein the linear actuator articulates responsive to the proximity of the ground sensor to the underlying surface.

8. The cotton harvester system of claim 1, wherein the pivot axis is defined at a location away from the first frame and the second frame and towards the underlying surface.

9. The cotton harvester system of claim 1, further comprising:
a linkage assembly coupled to the first frame
at least one top link coupling the first frame to the work machine;
at least one linear actuator coupling the first frame to the work machine; and
a sub-frame pivotally coupling the first frame to the work machine;
wherein the top link adjusts fore and aft orientation of the header unit relative to the work machine and the linear actuator raises and lowers the header unit relative to the work machine.

10. A cotton picker unit lift structure, comprising:
a first frame;
a second frame having a first header cross-member and a second header cross-member, the second frame pivotally coupled to the first frame about a pivot axis; and
at least one row unit coupled to the second frame;

wherein, the pivot axis is not oriented through the first frame or the second frame.

11. The cotton picker unit lift structure of claim 10, further comprising:
a first sliding joint slidably coupling the first frame to the first header cross-member; and
a second sliding joint slidably coupling the first frame to the second header cross-member.

12. A cotton harvester system, comprising:
a work machine comprising:
at least one ground engaging mechanism for moving the work machine over an underlying surface; and
a header unit, comprising:
a header frame assembly comprising:
a first frame removably coupled to the work machine; and
a second frame pivotally coupled to the first frame about a pivot axis;
a plurality of row units coupled to the header unit assembly; and
at least one sensor configured to measure a height of at least one row unit of the plurality of row units relative to the underlying surface;
wherein the pivot axis is not oriented through the first frame or the second frame.

13. The cotton harvester system of claim 12, further comprising:
a controller in communication with the at least one sensor;
wherein the second frame selectively pivots relative to the first frame in response to command of the controller.

14. The cotton harvester system of claim 13, further comprising a linear actuator pivotally coupled at a first end to the first frame and pivotally coupled at a second end to the second frame, wherein the linear actuator articulates in response to command of the controller to pivot the second frame about the pivot axis relative to the first frame.

15. The cotton harvester system of claim 12, further wherein the first frame comprises:
a single water coupler; and
a single hydraulic coupler;
wherein the plurality of row units is coupled to the work machine through the single water coupler and the single hydraulic coupler.

16. The cotton harvester system of claim 12, further comprising:
at least one sliding joint pivotally coupling the first frame to the second frame;
wherein, the at least one sliding joint comprises an arcuate opening defined in the second frame and a slider coupled to the first frame.

17. The cotton harvester system of claim 12, wherein the second frame further comprises:
a first header cross-member;
a second header cross-member spaced from and coupled to the first header cross-member;
a first sliding joint slidably coupling the second cross-member to the first frame;
a second sliding joint slidably coupling the first cross-member to the first frame; and
a third sliding joint slidably coupling the first cross member to the first frame.

* * * * *